(12) United States Patent
Araya

(10) Patent No.: US 10,160,270 B2
(45) Date of Patent: Dec. 25, 2018

(54) WHEEL POSITION SPECIFYING DEVICE

(71) Applicant: PACIFIC INDUSTRIAL CO., LTD., Ogaki-shi, Gifu-ken (JP)

(72) Inventor: Takao Araya, Mizuho (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 78 days.

(21) Appl. No.: 15/101,475

(22) PCT Filed: Sep. 9, 2015

(86) PCT No.: PCT/JP2015/075615
§ 371 (c)(1),
(2) Date: Jun. 3, 2016

(87) PCT Pub. No.: WO2017/042911
PCT Pub. Date: Mar. 16, 2017

(65) Prior Publication Data
US 2017/0190224 A1 Jul. 6, 2017

(51) Int. Cl.
*B60C 23/04* (2006.01)
(52) U.S. Cl.
CPC .......... *B60C 23/0416* (2013.01); *B60C 23/04* (2013.01); *B60C 23/0408* (2013.01); *B60C 23/0488* (2013.01); *B60C 23/0489* (2013.01)
(58) Field of Classification Search
None
See application file for complete search history.

(56) References Cited

U.S. PATENT DOCUMENTS 8,332,103 B2    12/2012  Greer et al.
2003/0197603 A1*  10/2003  Stewart ............... B60C 23/0416
                                              340/442
(Continued)

FOREIGN PATENT DOCUMENTS

JP    2008201369 A    9/2008
JP    2010122023 A    6/2010
(Continued)

OTHER PUBLICATIONS

Enclosed in it's English translation is a Notification of Reason of Refusal (Office Action);dated Dec. 27, 2017; Korean patent application No. 10-2016-7017716; 5 pages.
(Continued)

*Primary Examiner* — Andre J Allen
(74) *Attorney, Agent, or Firm* — Cantor Colburn LLP

(57) ABSTRACT

A vehicle is mounted with a pulse detecting unit that detects rotation of a wheel as pulses, a wheel rotation number storage unit that stores the number of pulses in correspondence with time, and a wheel position specifying device that specifies on which of the plurality of wheels the tire state detecting device arranged on each wheel is arranged. The wheel position specifying device includes a reception unit that receives a transmission signal, including a time required for the wheel to make a predetermined number of rotations, transmitted from each tire state detecting device, and a specifying unit that specifies the wheel on which each tire state detecting device is arranged from a difference of the number of pulses counted during the time included in the transmission signal and the number of pulses while the wheel makes the predetermined number of rotations.

2 Claims, 6 Drawing Sheets

(56) References Cited

U.S. PATENT DOCUMENTS

| | | | |
|---|---|---|---|
| 2006/0012469 A1* | 1/2006 | Hirai | B60C 23/0416 340/445 |
| 2011/0071737 A1 | 3/2011 | Greer et al. | |
| 2012/0029767 A1 | 2/2012 | Bailie et al. | |
| 2013/0207796 A1* | 8/2013 | Stewart | B60C 23/0416 340/438 |
| 2014/0076040 A1* | 3/2014 | Shima | B60C 23/0416 73/146.5 |
| 2014/0088816 A1* | 3/2014 | Shima | B60C 23/0416 701/29.1 |
| 2014/0167950 A1* | 6/2014 | Shima | B60C 23/0416 340/447 |
| 2014/0172241 A1* | 6/2014 | Shima | B60C 23/0416 701/49 |
| 2014/0184403 A1* | 7/2014 | Kosugi | B60C 23/0416 340/447 |
| 2014/0207329 A1* | 7/2014 | Juzswik | B60C 23/0416 701/32.7 |
| 2014/0354421 A1* | 12/2014 | Kosugi | B60C 23/0416 340/447 |
| 2015/0006104 A1* | 1/2015 | Okada | B60C 23/0416 702/138 |
| 2015/0191056 A1 | 7/2015 | Mori et al. | |
| 2016/0114636 A1* | 4/2016 | Terada | B60C 23/0416 73/146.5 |
| 2016/0280018 A1 | 9/2016 | Kosugi et al. | |
| 2017/0259627 A1* | 9/2017 | Araya | B60C 23/0416 |

FOREIGN PATENT DOCUMENTS

| | | |
|---|---|---|
| JP | 2013505167 A | 2/2013 |
| JP | 2013154686 A | 8/2013 |
| JP | 201513635 A | 1/2015 |
| JP | 2015074388 A1 | 4/2015 |
| JP | 2015102390 A | 6/2015 |
| KR | 1020140085303 A | 7/2014 |
| KR | 1020150041023 A | 4/2015 |

OTHER PUBLICATIONS

Enclosed is Office Action dated Dec. 27, 2017 during prosecution of the corresponding Korean patent application No. 10-2016-7017716, 10 pages.

Communication/European Search Report dated Sep. 13, 2017, during prosecution of the European patent corresponding application No. 15874380.7.

Enclosed is a translation of the International Preliminary Report on Patentability and Written Opinion of the International Searching Authority; International application No. PCT/JP2015/075615; International filing date: Sep. 9, 2015; 6 pages.

* cited by examiner

| ID | PNEUMATIC PRESSURE | TIME FOR THREE ROTATIONS | STATUS | CRC |

WHEEL POSITION SPECIFYING DEVICE

TECHNICAL FIELD

The present invention relates to a wheel position specifying device.

BACKGROUND ART

A wireless tire state monitoring device has been proposed that enables a driver, while in a vehicle compartment, to check the state of a plurality of tires provided on a vehicle (see e.g., Patent document 1). This type of tire state monitoring device includes a tire state detecting device attached to each wheel, to detect the state of the tire, and a receiver mounted on the vehicle body.

The tire state detecting device detects the state of the tire and transmits data associated with the state of the tire to the receiver. The receiver receives the data from the tire state detecting devices and obtains the state of each tire. The receiver, for example, displays the state of the tires on a display and activates an alarm or the like to notify the driver of an abnormality in a tire.

PRIOR ART DOCUMENT

Patent Document

Patent document 1: Japanese Laid-Open Patent Publication No. 2008-201369

SUMMARY OF THE INVENTION

Problems that the Invention is to Solve

The tire state monitoring device desirably specifies from which transmitter arranged on one of the plurality of tires the received data signal is transmitted, that is, the position of the wheel associated with the received data signal in the receiver.

It is an object of the present invention to provide a wheel position specifying device capable of specifying on which of the plurality of wheels the tire state detecting device is arranged.

Means for Solving the Problems

In order to solve the problem described above, according to a first aspect of the present invention, there is provided a wheel position specifying device arranged on a vehicle mounted with a pulse detecting unit that detects rotation of a wheel as pulses, a wheel rotation number storage unit that stores the number of pulses detected by the pulse detecting unit in correspondence with time, a tire state detecting device, arranged on each of a plurality of wheels of the vehicle, and the wheel position specifying device, which specifies on which of the wheels the tire state detecting device is arranged. The wheel position specifying device includes a reception unit that receives a transmission signal, including a time required for the wheel to make a predetermined number of rotations, transmitted from each tire state detecting device; and a specifying unit that specifies on which wheel each tire state detecting device is arranged from a difference between the number of pulses counted during the time included in the transmission signal and a number of pulses detected by the pulse detecting unit while the wheel makes the predetermined number of rotations.

The tire state detecting device includes the time required for the wheel to make the predetermined number of rotations in the transmission signal and transmits the transmission signal. The wheel rotates with the travel of the vehicle, but the number of rotations of each wheel differs. The tire state detecting device measures the time required for the wheel including the tire state detecting device to make the predetermined number of rotations. During this time, the pulse detecting unit corresponding to each wheel counts the pulses corresponding to the predetermined number of rotations. The number of pulses detected by the pulse detecting unit while each wheel makes one rotation is defined in advance. Thus, the number of pulses detected by the pulse detecting unit when the wheel makes the predetermined number of rotations can be determined in advance. According to the configuration described above, the reception unit tracks back by the time included in the transmission signal with the reception of the transmission signal as a trigger to acquire the number of pulses counted until receiving the transmission signal. In this case, the difference between the number of pulses corresponding to the wheel in which the tire state detecting device that transmitted the transmission signal is arranged and the number of pulses corresponding to the predetermined number of rotations becomes the smallest. Thus, the wheel on which each tire state detecting device is arranged can be specified.

In the wheel position specifying device described above, the specifying unit preferably accumulates a difference between the number of pulses counted during the time included in the transmission signal and the number of pulses detected by the pulse detecting unit while the wheel makes the predetermined number of rotations and specifies the wheel on which each tire state detecting device is arranged from the accumulated value.

Although the number of rotations of each wheel differs, a difference is less likely to occur in the number of rotations of each wheel if the vehicle is advancing straight. Thus, if the vehicle is advancing straight, the numbers of pulses of the wheels counted during the time included in the transmission signal all are likely to differ from the number of pulses corresponding to the predetermined number of rotations by an amount that is within the acceptable range. According to the configuration described above, the wheel on which each tire state detecting device is arranged can be specified by using the value obtained by accumulating the difference in the number of pulses.

Effects of the Invention

According to the present invention, the wheel of a plurality of wheels of a vehicle on which a tire state detecting device is arranged can be specified.

MODE FOR CARRYING OUT THE INVENTION

One embodiment of a wheel position specifying device of the present invention will be hereinafter described with reference to FIGS. 1 to 7.

Figure 1A:
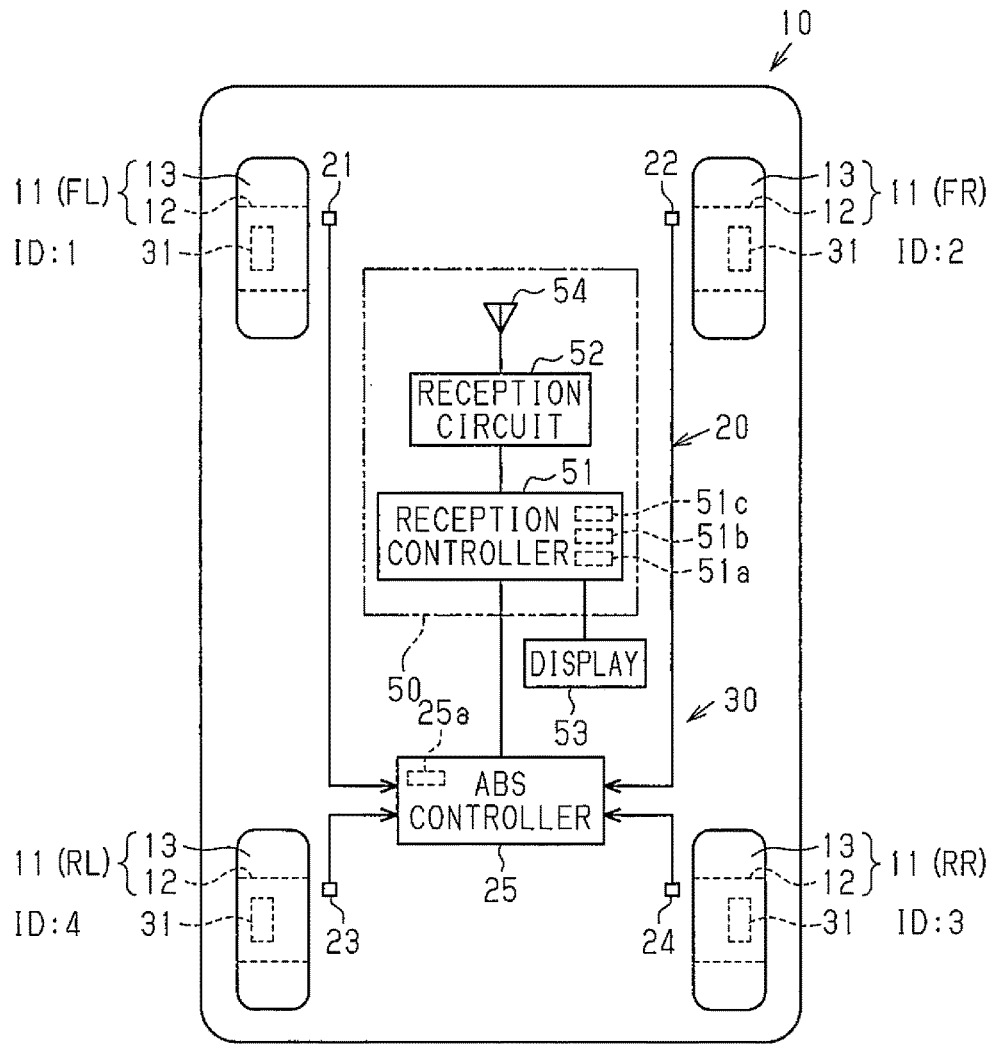
FIG. 1A is a schematic configuration view of a vehicle mounted with a wheel position specifying device according to one embodiment of the present invention.

As shown in FIG. 1A, an ABS (Antilock Brake System) 20 and a tire state monitoring device 30 are mounted on a vehicle 10. The ABS 20 includes an ABS controller 25 and rotation sensor units 21 to 24 corresponding to four wheels 11 of the vehicle 10. The first rotation sensor unit 21 corresponds to a left front wheel FL arranged on the left front side, and the second rotation sensor unit 22 corresponds to a right front wheel FR arranged on the right front side. The third rotation sensor unit 23 corresponds to a left rear wheel RL arranged on the left rear side, and the fourth rotation sensor unit 24 corresponds to a right rear wheel RR arranged on the right rear side. Each wheel 11 is configured from a vehicle wheel 12, and a tire 13 attached to the vehicle wheel 12. The ABS controller 25 includes a microcomputer or the like. The ABS controller 25 obtains the rotation position (rotation angle) of each wheel 11 based on a pulse count value from the rotation sensor unit 21 to 24.

Figure 2A:
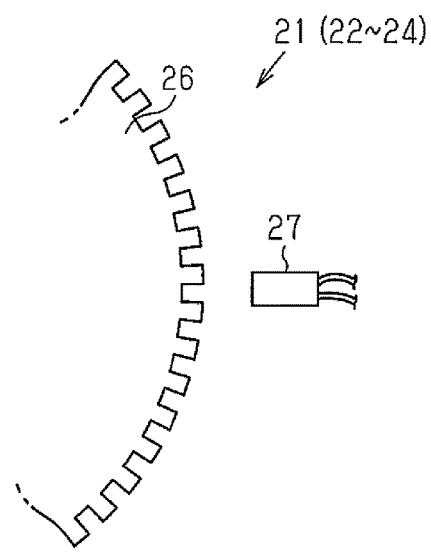
FIG. 2A is a schematic configuration view of a rotation sensor unit.

As shown in FIG. 2A, each rotation sensor unit 21 to 24 serving as a pulse detecting unit includes a gear 26, which integrally rotates with the wheel 11, and a detector 27, which is arranged to face the outer circumferential surface of the gear 26. Teeth (48 in the present embodiment) are arranged at equiangular intervals on the outer circumferential surface of the gear 26. The detector 27 detects pulses generated by the rotation of the gear 26. The ABS controller 25 is connected by wire to each detector 27. The ABS controller 25 obtains the rotation position of each wheel 11 based on a count of the number of pulses of each detector 27. Specifically, the gear 26 causes the detector 27 to generate a number of pulses according to the number of teeth on the gear 26 each time the gear 26 makes one rotation. The ABS controller 25 counts the pulses generated by the detector 27 and divides the counted number of pulses by the number of pulses (96) for one rotation to obtain the remainder, thus calculating the pulse count value. The ABS controller 25 divides 360 degrees by the number of pulses generated by the detector 27 while the wheel 11 makes one rotation (360 degrees) to determine how many times the gear 26 rotated for one pulse count. The rotation position of the wheel 11 is thereby obtained from the pulse count value.

Figure 2B:
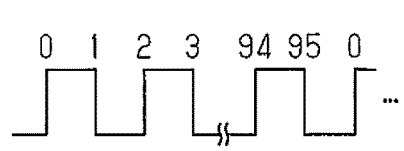
FIG. 2B is a schematic view describing a pulse generated by a detector and a method for counting the pulse.

As shown in FIG. 2B, the ABS controller 25 counts the rise and fall of the pulse to count the pulse count value from 0 to 95 every time the wheel 11 makes one rotation.

The ABS controller 25 includes a wheel rotation number storage unit 25a. The wheel rotation number storage unit 25a stores the number of pulses detected by each rotation sensor unit 21 to 24 in correspondence with time.

Next, the tire state monitoring device 30 will be described.

As shown in FIG. 1A, the tire state monitoring device 30 includes a transmitter 31 attached to each of the four wheels 11 and a receiver 50 installed on the vehicle body of the vehicle 10. Each transmitter 31 is arranged in an internal space of the tire 13, which tire 13 is attached to the vehicle wheel 12. Each transmitter 31 serving as the tire state detecting device detects the state of the corresponding tire 13 and wirelessly transmits a signal including the data indicating the state of the tire.

Figure 3:
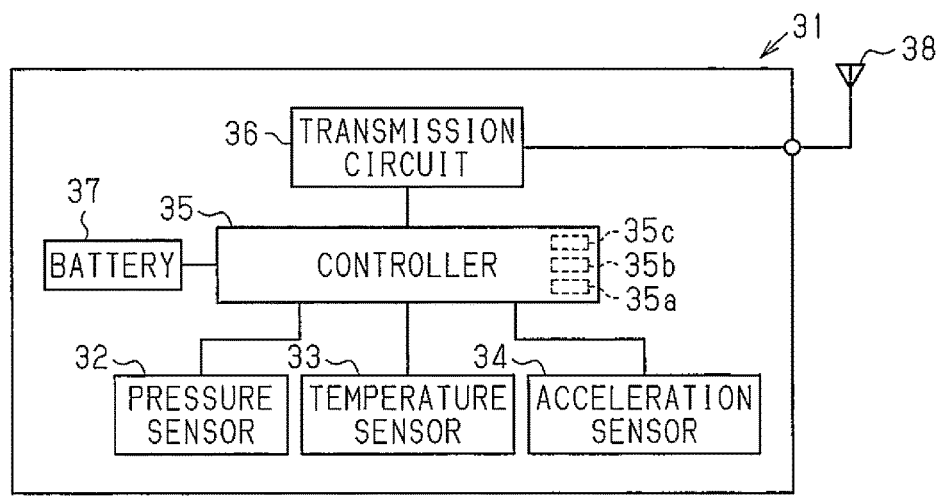
FIG. 3 is a schematic configuration view of a transmitter.

As shown in FIG. 3, each transmitter 31 includes a pressure sensor 32, a temperature sensor 33, an acceleration sensor 34, a controller 35, a transmission circuit 36, a transmission antenna 38, and a battery 37, which becomes the power source of the transmitter 31. The transmitter 31 is operated by the supply power from the battery 37, and the controller 35 comprehensively controls the operation of the transmitter 31. The pressure sensor 32 detects the pressure (tire inner pressure) in the corresponding tire 13. The temperature sensor 33 detects the temperature (tire inner temperature) in the corresponding tire 13. The pressure in the tire 13 and the temperature in the tire 13 are detected as the states of the tire 13 using the pressure sensor 32 and the temperature sensor 33.

Figure 1B:
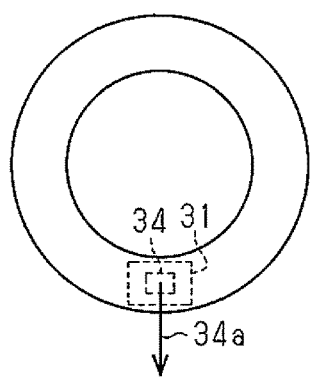
FIG. 1B is a schematic view showing a relationship of a detection axis of an acceleration sensor and a wheel.

As shown in FIG. 1B, the acceleration sensor 34 integrally rotates with the wheel 11 and detects the acceleration acting on itself. The acceleration sensor 34 is arranged such that a detection axis 34a is directed downward in a vertical direction when the transmitter 31 is located at a lowermost position of the wheel 11. The detection axis 34a detects a centrifugal acceleration value as a DC component and detects a gravitational acceleration value as an AC component. An acceleration value obtained by adding the gravitational acceleration value to the centrifugal acceleration value is output from the acceleration sensor 34.

Figure 4A:
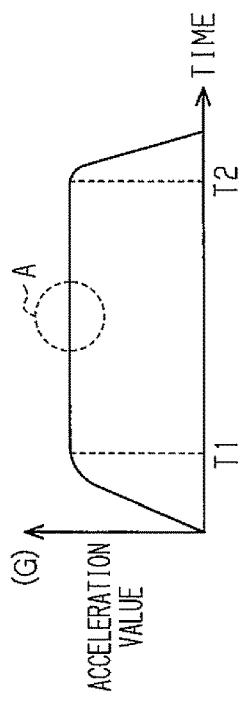
FIG. 4A is a graph showing change in an acceleration value.

Assume a case in which the vehicle 10 is accelerated up to time T1, travels at a constant speed from time T1 to time T2, and decelerates from time T2, as shown in FIG. 4A. The acceleration value detected by the acceleration sensor 34 increases until time T1 by the increase in the centrifugal acceleration value caused by the acceleration of the vehicle 10 and then decreases from time T2 by the decrease in the centrifugal acceleration value caused by the deceleration of the vehicle 10. The acceleration value is substantially constant from time T1 to time T2, during which the vehicle 10 is travelling at a constant speed. The acceleration value includes the gravitational acceleration value as the AC component. Thus, the acceleration value changes in a sinusoidal manner according to the gravitational acceleration.

Figure 4B:
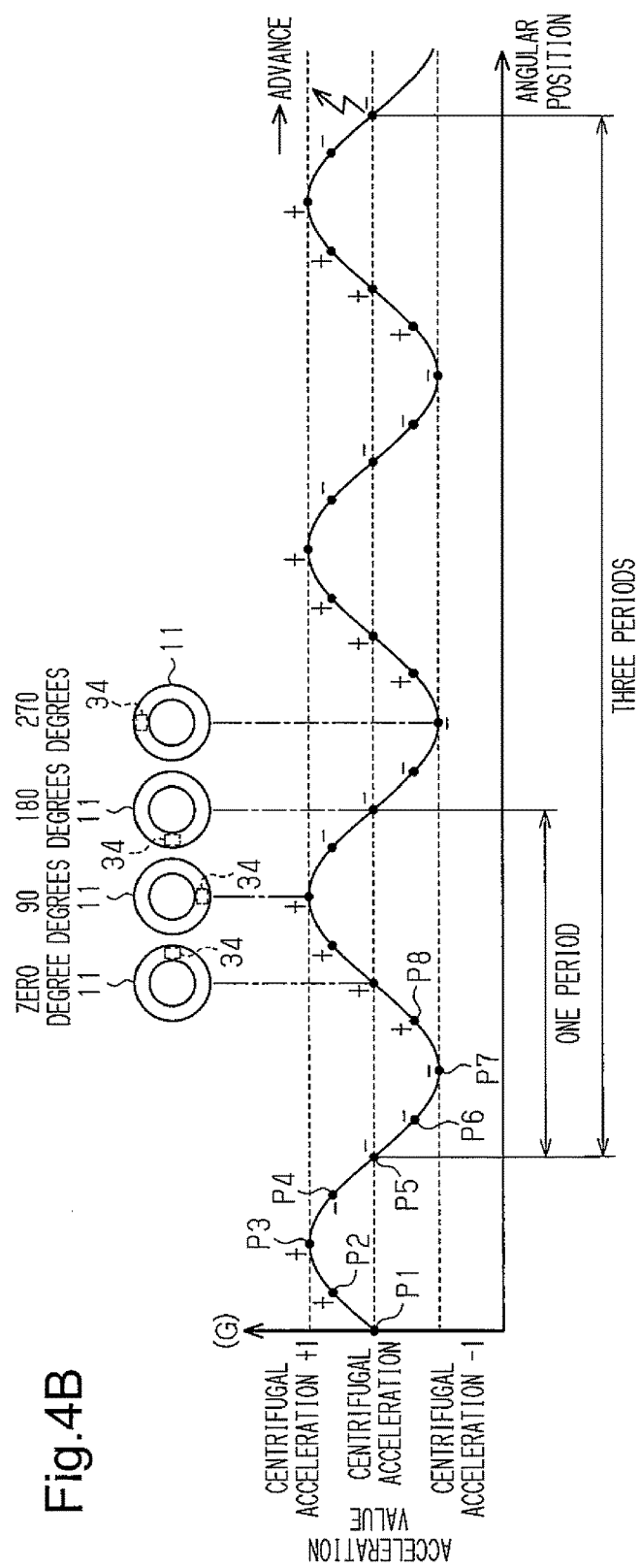
FIG. 4B is a graph showing change in the acceleration value by a gravitational acceleration value.

FIG. 4B shows the portion of reference character A in FIG. 4A in an enlarged manner. The AC component contained in the acceleration value changes in a sinusoidal manner between ±1 G (voltage corresponding thereto) by the rotation of the wheel 11. Assume that the angle of the wheel 11 when the transmitter 31 is located at the front most position of the wheel 11 is zero degrees, and the angle when the wheel 11 rotated in an advancing direction of the vehicle 10 is positive. When the angle of the wheel 11 is zero degrees, the acceleration sensor 34 detects the acceleration value in which 0 G is added as the gravitational acceleration value to the centrifugal acceleration value. When the angle of the wheel 11 is +90 degrees, the transmitter 31 (acceleration sensor 34) is located at the lowermost position of the wheel 11, and the acceleration sensor 34 detects the acceleration value in which +1 G is added as the gravitational acceleration value to the centrifugal acceleration value.

When the angle of the wheel 11 is +180 degrees, the transmitter 31 is located at the rearmost position of the wheel 11, and the acceleration sensor 34 detects the acceleration value in which 0 G is added as the gravitational acceleration value to the centrifugal acceleration value. When the angle of the wheel 11 is +270 degrees, the transmitter 31 is located at the uppermost position of the wheel 11, and the acceleration sensor 34 detects the acceleration value in which −1 G is added as the gravitational acceleration value to the centrifugal acceleration value.

As shown in FIG. 3, the controller 35 includes a microcomputer or the like including a CPU 35a, a storage unit (RAM, ROM, etc.) 35b, and a timer 35c. An ID, which is identification information unique to each transmitter 31, is registered in the storage unit 35b. The ID is information used to identify each transmitter 31 in the receiver 50. In the present embodiment, the ID of the transmitter 31 arranged on the left front wheel FL is "1", the ID of the transmitter 31 arranged on the right front wheel FR is "2", the ID of the transmitter 31 arranged on the right rear wheel RR is "3", and the ID of the transmitter 31 arranged on the left rear wheel RL is "4". For the sake of convenience of explanation, the ID is expressed as "1" to "4", but this is not the sole case.

The controller 35 acquires the tire inner pressure data from the pressure sensor 32, the tire inner temperature data from the temperature sensor 33, and the acceleration data from the acceleration sensor 34 at an acquiring frequency defined in advance. The acquiring frequency of each data may be the same, or may be different depending on the data.

As shown in FIG. 4B, the controller 35 acquires the acceleration data each time the controller 35 is located at eight acquiring angles P1 to P8 while the wheel 11 makes one rotation (one period). Although the rotation speed of the wheel 11 changes according to the acceleration/deceleration by the driver, the controller 35 calculates the time required for the wheel 11 to make one rotation from the acceleration value of the acceleration sensor 34. As described above, the acceleration of the acceleration sensor 34 changes by the speed of the vehicle 10. Thus, the speed of the vehicle 10 and the time required for the wheel 11 to make one rotation can be calculated from the acceleration value. The controller 35 determines the acquiring frequency, which is obtained by equally dividing the time required for the wheel 11 to make one rotation by eight and acquires the acceleration data from the acceleration sensor 34 at the determined acquiring frequency. The controller 35 acquires the acceleration data from the acceleration sensor 34 every 45 degrees, which is the angular difference between each acquiring angle P1 to P8, while the wheel 11 makes one rotation.

The controller 35 outputs data including the tire inner pressure data, the tire inner temperature data, and the ID to the transmission circuit 36. The transmission circuit 36 modulates the data from the controller 35 and generates a transmission signal. The transmission circuit 36 wirelessly transmits the transmission signal from the transmission antenna 38. The controller 35 transmits the transmission signal from the transmission circuit 36 at a transmission interval set in advance.

As shown in FIG. 1A, the receiver 50 includes a reception controller 51, a reception circuit 52, and a reception antenna 54. A display 53 is connected to the reception controller 51. The reception controller 51 includes a microcomputer or the like including a reception side CPU 51a, a reception side storage unit (ROM, RAM, etc.) 51b, and a reception side timer 51c. A program for comprehensively controlling the operation of the receiver 50 is stored in the reception side storage unit 51b. The reception circuit 52 serving as a reception unit demodulates the transmission signal received from each transmitter 31 through the reception antenna 54 and transmits the same to the reception controller 51.

The reception controller 51 determines the tire inner pressure and the tire inner temperature, which indicate the state of the tire 13 corresponding to the transmitter 31 of the transmission source based on the transmission signal from the reception circuit 52. The reception controller 51 displays the information associated with the tire inner pressure or the like on the display 53. Furthermore, the reception controller 51 displays to which of the four wheels 11 the tire inner pressure corresponds in accordance with the information associated with the tire inner pressure.

The reception controller 51 is connected to the ABS controller 25 and is able to acquire the pulse count value of each rotation sensor unit 21 to 24 through the ABS controller 25.

Next, a wheel position specifying device for specifying on which of the wheels 11 each transmitter 31 is arranged will be described with reference to FIG. 4B. In the present embodiment, the receiver 50 functions as the wheel position specifying device. The receiver 50 uses both a first wheel position specifying process and a second wheel position specifying process to specify on which of the wheels 11 each transmitter 31 is arranged. First, the transmission signal transmitted by the transmitter 31 will be described in detail.

As shown in FIG. 4B, the controller 35 of the transmitter 31 acquires the acceleration value at each acquiring angle P1 to P8. The controller 35 compares the acceleration value acquired at one acquiring angle and the acceleration value acquired at the acquiring angle one time before the relevant acquiring angle. The controller 35 then determines if the acceleration value acquired at each acquiring angle increased or decreased from the acceleration value acquired at the acquiring angle one time before. In FIG. 4B, "+" is denoted when the acceleration value increased from the acceleration value acquired at the acquiring angle one time before, and "−" is denoted when the acceleration value decreased from the acceleration value acquired at the acquiring angle one time before. In the following description as well, the acquiring angle at which the acceleration value increased from the acquiring angle one time before is appropriately expressed as "+", and the acquiring angle at which the acceleration value decreased from the acquiring angle one time before is appropriately expressed as "−".

Although the acceleration value is obtained by adding the gravitational acceleration value to the centrifugal acceleration value, the possibility the speed of the vehicle 10 will change drastically while the wheel 11 makes one rotation is low. Thus, the change in the centrifugal acceleration value can be ignored. The change in the acceleration value between the acquiring angles P1 to P8 thus can be assumed as the change in the gravitational acceleration value.

The timing at which the acceleration value acquired at each acquiring angle P1 to P8 is inverted from increase to decrease or from decrease to increase is when the transmitter 31 crosses the lowermost position or the uppermost position of the wheel 11. When the acceleration values acquired at the acquiring angles P1 to P8 are inverted from increase to decrease or from decrease to increase, the acquiring angles are in the order of "+" "−" or in the order of "−" "+" in the advancing direction of the vehicle 10. When the acquiring angles are in a series in the order of "+" "−", it can be understood that the transmitter 31 crossed the lowermost position of the wheel 11. Furthermore, when the transmission signal is transmitted at the time of "−" of the series "+" "−", the transmission signal is transmitted from the transmitter 31 at the time the transmitter 31 crosses the lowermost position of the wheel 11. When the acquiring angles are in a series in the order of "−" "+", it can be understood that the transmitter 31 crossed the uppermost position of the wheel 11. Furthermore, when the transmission signal is transmitted at the time of "+" of the series "−" "+", the transmission signal is transmitted from the transmitter 31 at the time the transmitter 31 crosses the uppermost position of the wheel 11.

In the present embodiment, the transmitter 31 is assumed to have crossed the lowermost position of the wheel 11 when the acquiring angles are in a series in the order of "+" "+" "−" "−" (hereinafter described as transmission pattern). Furthermore, the controller 35 causes the transmission signal to be transmitted from the transmitter 31 at the acquiring angle of the second "−" in the transmission pattern described above. More specifically, the controller 35 causes the transmission signal to be transmitted from the transmitter 31 when the interval from the previous transmission signal has elapsed and the acquiring angle of the second "−" of the transmission pattern is detected.

Furthermore, the controller 35 measures the time the wheel 11 makes one rotation from the change in increase and decrease of the acceleration value acquired at the acquiring angle. For example, the timer 35c measures the time between the second "−" of the transmission pattern at which the transmission signal is transmitted and the second "−" of the transmission pattern one time before the relevant transmission pattern. The time required for the wheel 11 to make one rotation is thereby obtained. In the present embodiment, the timer 35c measures the time required for the wheel 11 to make three rotations (predetermined number of rotations) by measuring the time between the second "−" of the transmission pattern at which the transmission signal is transmitted and the second "−" of the transmission pattern three times before the relevant transmission pattern. The transmitter 31 includes the time required for the wheel 11 to make three rotations in the transmission signal and transmits the transmission signal.

Figures 6, 7:
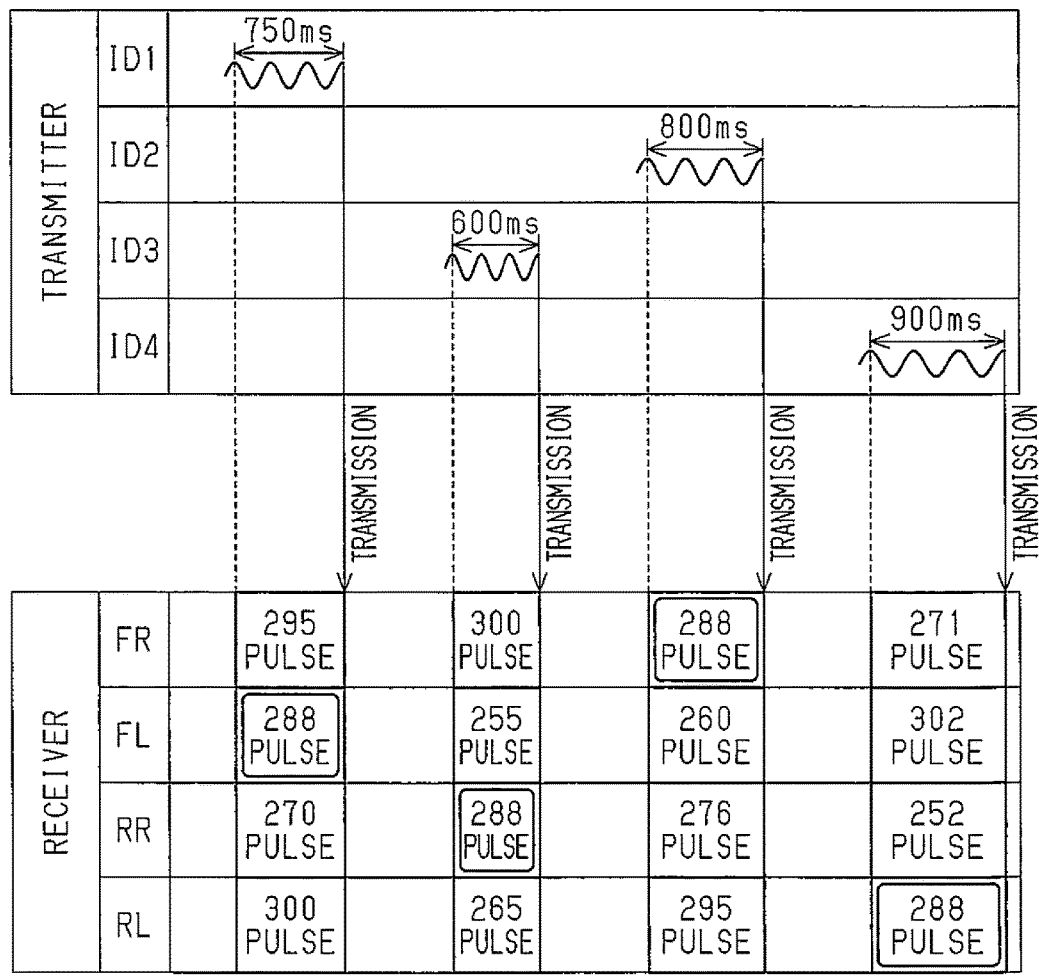
FIG. 6 is a table showing a data formation of the transmission signal.
FIG. 7 is a view describing a second wheel position specifying process.

As shown in FIG. 6, the transmission signal includes data indicating the time required for the wheel 11 to make three rotations, in addition to the data of the ID, the pneumatic pressure data of the tire 13, the status indicating the state of the vehicle 10, and the code for error correction such as CRC.

Next, the first wheel position specifying process carried out by the receiver 50 will be described with reference to FIGS. 1 and 5.

The reception controller 51 of the receiver 50 acquires the pulse count value of each rotation sensor unit 21 to 24, that is, the rotation position of the wheel 11 from the ABS controller 25 at the instant of receiving the transmission signal. The reception controller 51 then specifies on which wheel 11 each transmitter 31 is arranged. Hereinafter, a description will be made focusing on the wheel 11, where the transmitter 31 with the ID "1" is arranged, for example, of the four wheels 11.

Figure 5:
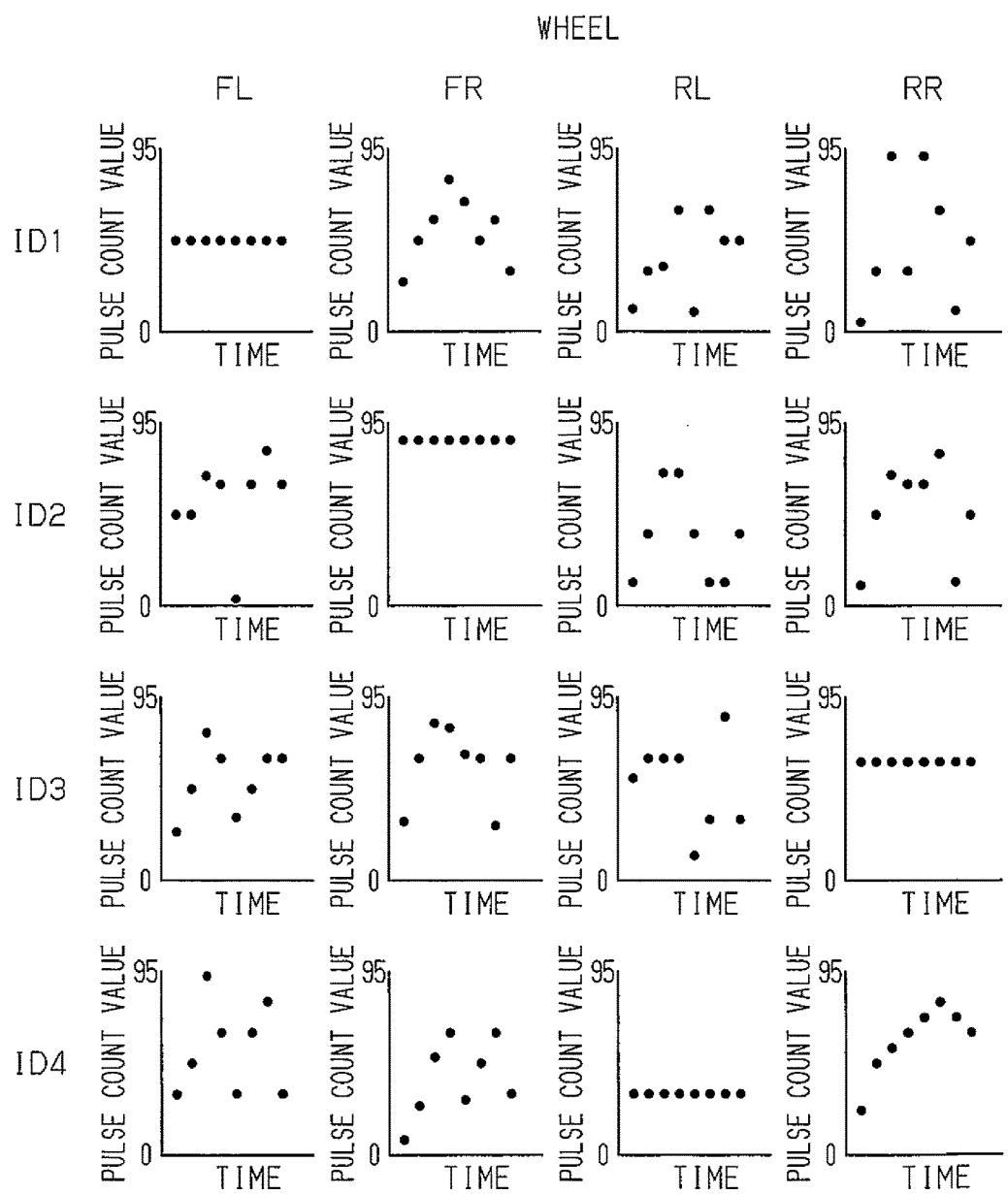
FIG. 5 is a graph showing a number of pulses of each rotation sensor unit at an instant of receiving a transmission signal transmitted from a transmitter with an ID "1".

As shown in FIGS. 1 and 5, when receiving the transmission signal transmitted from the transmitter 31 with the ID "1", the reception controller 51 acquires the pulse count value of each rotation sensor unit 21 to 24 (rotation position of the wheel 11) from the ABS controller 25 at the instant of receiving such transmission signal. The number of rotations of each wheel 11 differs by the influence of a differential gear or the like. Thus, when the pulse count value of each rotation sensor unit 21 to 24 is acquired over plural times at the instant of receiving the transmission signal transmitted from the transmitter 31 with the ID "1", the variation becomes small only in the pulse count value of the rotation sensor unit 21 to 24 corresponding to the wheel 11 where the transmitter 31 with the ID "1" is arranged. The reception controller 51 receives the transmission signal over plural times. The reception controller 51 acquires the pulse count value of each rotation sensor unit 21 to 24 every time the reception controller 51 receives the transmission signal and obtains the difference in the pulse count value of each rotation sensor unit 21 to 24. The reception controller 51 specifies that the transmitter 31 with the ID "1" is arranged on the wheel corresponding to the rotation sensor unit with the smallest variation.

As shown in FIG. 5, the pulse count value of the rotation sensor unit 21 corresponding to the left front wheel FL indicates a constant value. Thus, the wheel 11, where the transmitter 31 with the ID "1" is arranged, can be specified as being arranged on the left front wheel FL of the vehicle 10. Similar process can be carried out for the transmitters 31 with the IDs "2", "3", and "4" to specify on which wheel 11 the transmitter 31 with the respective ID is arranged. For the sake of convenience of explanation, FIG. 5 shows a case in which the transmission signal is always transmitted at a constant angle, and the pulse count value always shows a constant value. However, the transmission signal can be actually transmitted slightly shifted from the constant angle due to the tolerances or the like of each member of the transmitter 31. Thus, a slight difference is also formed in the pulse count value of each rotation sensor unit 21 to 24 of when the transmission signal is received.

The second wheel position specifying process carried out by the receiver 50 will now be described with reference to FIG. 7.

As shown in FIG. 7, description will be made focusing on the wheel 11, where the transmitter 31 with the ID "1" is arranged, for example, of the four wheels 11. When receiving the transmission signal transmitted from the transmitter 31 with the ID "1", the reception controller 51 serving as a specifying unit tracks back by the time (e.g., 750 ms) for three rotations from the instant of receiving the transmission signal and acquires the number of pulses counted by each rotation sensor unit 21 to 24 until receiving the transmission signal. While the wheel 11, where the transmitter 31 with the ID "1" is arranged, makes three rotations, the pulses for three rotations are also generated in the rotation sensor unit corresponding to the relevant wheel 11. As the number of rotations of each wheel 11 differs, the difference in the number of pulses from the number of pulses for three rotations is generated in the rotation sensor unit corresponding to the wheel 11 other than the relevant wheel 11, while such wheel 11, where the transmitter 31 with the ID "1" is arranged, makes three rotations.

The number of pulses produced while the wheel 11 makes one rotation can be determined in advance and is "96" in the present embodiment. The predetermined number of rotations of the wheel 11, which is "3", is multiplied by "96", so that the number of pulses when the wheel 11 makes three rotations becomes "288". This value is stored in the reception side storage unit 51b.

When receiving the transmission signal transmitted from the transmitter 31 with the ID "1", the reception controller 51 tracks back by the time duration included in the transmission signal to acquire the number of pulses. In this case, the number of pulses counted by the first rotation sensor unit 21 corresponding to the left front wheel FL, where the transmitter 31 with the ID "1" is arranged, becomes "288", which is the number of pulses for three rotations. The number of pulses of the other rotation sensor units 22 to 24 takes a value different from "288".

Thus, the reception controller 51 specifies that the transmitter 31 with the ID "1" is arranged on the left front wheel FL corresponding to the first rotation sensor unit 21. When the time for three rotations included in the transmission signal transmitted from the transmitter 31 with the ID "2" is, for example, 800 ms, the reception controller 51 tracks back 800 ms from the instant of receiving the transmission signal to acquire the number of pulses of each rotation sensor unit 21 to 24. In the present embodiment, the number of pulses counted by the second rotation sensor unit 22 corresponding to the right front wheel FR becomes "288", and the reception controller 51 specifies that the transmitter 31 with the ID "2" is arranged on the right front wheel FR. When the time for three rotations included in the transmission signal transmitted from the transmitter 31 with the ID "3" is, for example, 600 ms, the reception controller 51 tracks back 600 ms from the instant of receiving the transmission signal to acquire the number of pulses of each rotation sensor unit 21 to 24. In the present embodiment, the number of pulses counted by the fourth rotation sensor unit 24 corresponding to the right rear wheel RR becomes "288", and the reception controller 51 specifies that the transmitter 31 with the ID "3" is arranged on the right rear wheel RR. When the time for three rotations included in the transmission signal transmitted from the transmitter 31 with the ID "4" is, for example, 900 ms, the reception controller 51 tracks back 900 ms from the instant of receiving the transmission signal to acquire the number of pulses of each rotation sensor unit 21 to 24. In the present embodiment, the number of pulses counted by the third rotation sensor unit 23 corresponding to the left rear wheel RL becomes "288", and the reception controller 51 specifies that the transmitter 31 with the ID "4" is arranged on the left rear wheel RL.

In the example described above, a case in which the number of rotations of each wheel 11 differs while the wheel 11 makes three rotations under an ideal environment that does not take into consideration tolerances of the transmitter 31 and the receiver 50, measurement error of the acceleration value, or the like, time required from transmission to reception of the transmission signal or the like, has been described for the sake of convenience of explanation. However, in practice, tolerances exists in the transmitter 31 and the receiver 51, and the measurement error of the acceleration value or the like also exists. Thus, even if the reception controller 51 tracks back by the time duration included in the transmission signal to acquire the number of pulses, the number of pulses of the rotation sensor unit corresponding to the wheel 11, where the transmitter 31 that transmitted the transmission signal is arranged, takes a value slightly shifted from "288". An acceptable range is thus set to the number of pulses acquired by tracking back by the time duration included in the transmission signal. Furthermore, if the difference between the acquired number of pulses and "288" is within an acceptable range, specification is made as the wheel 11 where the transmitter 31 that transmitted the transmission signal is arranged. For the acceptable range, the number of pulses counted by each rotation sensor unit when the wheel 11 is rotated by a predetermined number of rotations (three rotations in the present embodiment) is set in view of the tolerances of each member, the measurement error, or the like.

The difference is formed in the number of rotations of each wheel 11 when the vehicle 10 makes a left or right turn. Thus, the difference is less likely to occur in the number of rotations of each wheel 11 when the vehicle 10 is advancing straight. As a result, even if the number of pulses of each rotation sensor unit 21 to 24 is acquired by tracking back by the time duration included in the transmission signal from the instant of receiving the transmission signal, the number of pulses from the plurality of rotation sensor units all fall within the acceptable range.

In this case, it is assumed that the wheel 11 on which each transmitter 31 is arranged is not specified. The same process is carried out when the transmission signal transmitted the next and subsequent times is received, and the process described above is continued until there is only one rotation sensor unit that counted the number of pulses within the acceptable range. The rotation sensor unit in which the difference of the number of pulses counted within a time included in the transmission signal and the number of pulses counted by each rotation sensor unit while the wheel 11 makes three rotations is the smallest is specified. The transmitter 31 that transmitted the transmission signal is arranged on the wheel 11 corresponding to the specified rotation unit.

The receiver 50 carries out the first wheel position specifying process and the second wheel position specifying process in parallel, and the wheel 11 on which each transmitter 31 is arranged is specified by either one of the wheel position specifying processes, the result of the process that was able to specify faster is adopted.

Therefore, the embodiment described above has the following effects.

(1) The transmitter 31 arranged on each wheel 11 includes the time required for the wheel 11 to make three rotations in the transmission signal and transmits the relevant transmission signal. The reception controller 51 tracks back by the time duration included in the transmission signal with the reception of the transmission signal as a trigger, and acquires the number of pulses counted by each rotation sensor unit 21 to 24 until receiving the transmission signal. The reception controller 51 specifies the rotation sensor unit in which the difference of the acquired number of pulses and the number of pulses for three rotations is the smallest, and specifies that the transmitter 31 that transmitted the transmission signal is arranged on the wheel 11 corresponding to the relevant rotation sensor unit.

(2) In the second wheel position specifying process, the wheel 11 on which each transmitter 31 is arranged is specified by the time required for the wheel 11 to make three rotations. Therefore, there is no need to specify the wheel 11 on which each transmitter 31 is arranged by taking the statistics of a plurality of data as in the first wheel position specifying process. Thus, in the second wheel position specifying process, the wheel 11 on which each transmitter 31 is arranged is specified faster than in the first wheel position specifying process.

(3) The receiver 50 carries out the first wheel position specifying process and the second wheel position specifying process in parallel to specify the wheel 11 on which each transmitter 31 is arranged. In this case, the wheel 11 on which each transmitter 31 is arranged merely needs to be specified by either one of the first wheel position specifying process or the second wheel position specifying process. Thus, the time for specifying on which wheel 11 each transmitter 31 is arranged is reduced.

The embodiment described above may be modified as below.

Figure 8A:
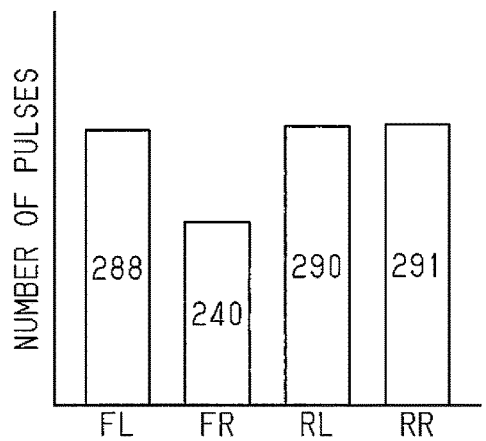
FIGS. 8A and 8B are graphs showing variants of the second wheel position specifying process.
Figure 8B:
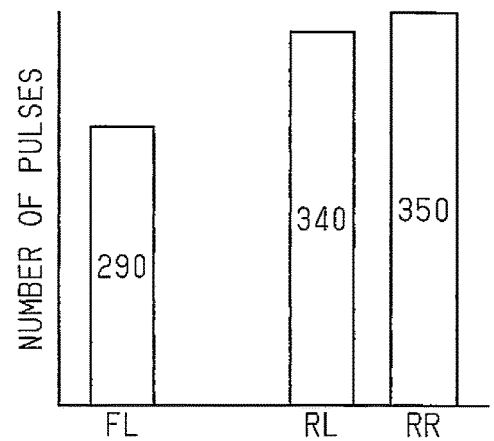

On which wheel 11 each transmitter 31 is arranged may be specified by excluding the rotation sensor unit in which the number of pulses is outside the acceptable range. For example, assume a case in which the acceptable range of the number of pulses is "288±40", and the transmission signal is received twice. As shown in FIG. 8A, when receiving the first transmission signal, the reception controller 51 tracks back from the instant of receiving the transmission signal to acquire the number of pulses. At this point, the number of pulses of only the rotation sensor unit 22 corresponding to the right front wheel FR is outside the acceptable range, and hence it is specified that the right front wheel FR is not the wheel 11 where the transmitter 31 that transmitted the transmission signal is arranged. Next, as shown in FIG. 8B, when receiving the second transmission signal, the reception controller 51 tracks back from the instant of receiving the transmission signal to acquire the number of pulses. At this point, the reception controller 51 does not acquire the number of pulses of the rotation sensor unit 22 corresponding to the right front wheel FR Thus, the rotation sensor unit in which the number of pulses is outside the acceptable range may be excluded each time the transmission signal is received, and it can be specified that the transmitter 31 that transmitted the transmission signal is arranged on the wheel 11 corresponding to the last remaining rotation sensor unit.

The difference of the number of pulses counted by each rotation sensor unit 21 to 24 during the time included in the transmission signal and the number of pulses (288) for three rotations is accumulated, and the wheel on which each transmitter 31 is arranged may be specified from the accumulated value (hereinafter referred to as number of accumulated counts). For example, assume a case in which the transmission signal is received twice.

Figure 9A:
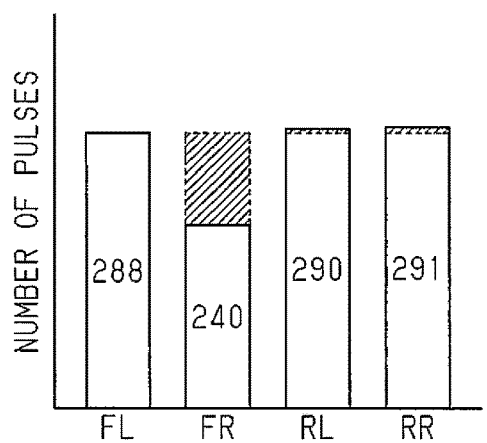
FIGS. 9A and 9B are graphs showing variants of the second wheel position specifying process.
Figure 9A:
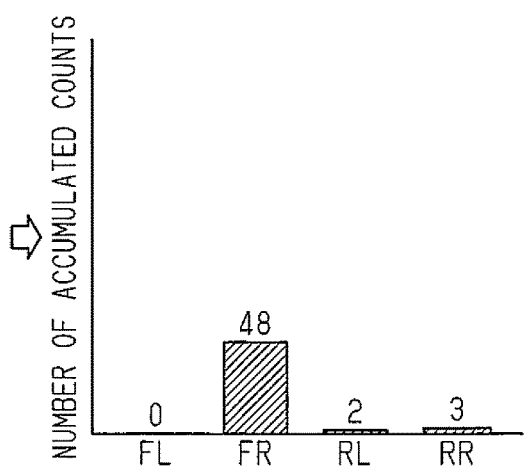

As shown in FIG. 9A, when receiving the first transmission signal, the reception controller 51 tracks back from the instant of receiving the transmission signal to acquire the number of pulses of each rotation sensor unit 21 to 24. Next, the reception controller 51 calculates the difference (absolute value) of the acquired number of pulses and 288 for every acquired number of pulses of each rotation sensor unit 21 to 24. As shown with diagonal lines in FIG. 9A, the reception controller 51 stores the calculated value as the number of accumulated counts.

Figure 9B:
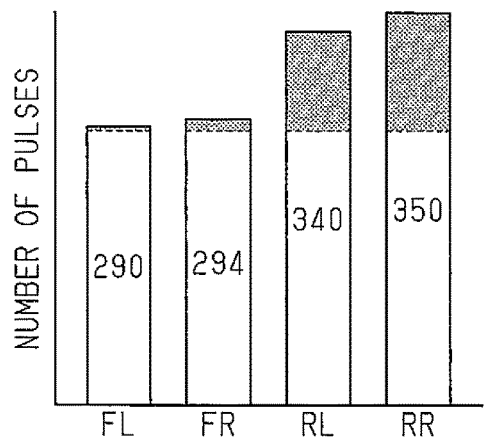
Figure 9B:
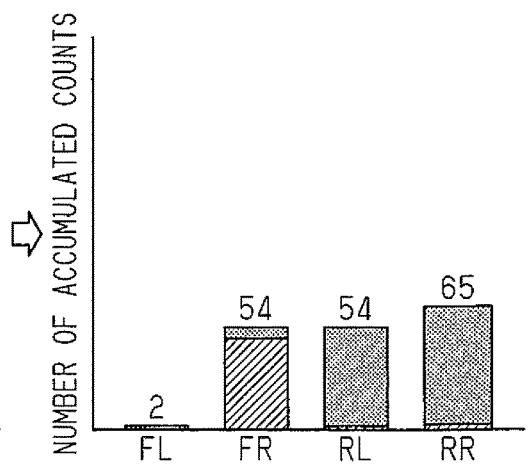

As shown in FIG. 9B, when receiving the second transmission signal, the reception controller 51 tracks back from the instant of receiving the transmission signal to acquire the number of pulses. Next, the reception controller 51 calculates the difference (absolute value) of the acquired number of pulses and 288 for every acquired number of pulses of each rotation sensor unit 21 to 24. The reception controller 51 then adds the accumulated counts of when receiving the second transmission signal to the number of accumulated counts of when receiving the first transmission signal. The difference of the number of pulses and 288 is accumulated every time the transmission signal transmitted from the transmitter 31 with the same ID is received, so that the number of accumulated counts of the rotation sensor unit corresponding to the wheel 11 where the transmitter 31 with the relevant ID is arranged becomes the smallest. A threshold value is set for the number of accumulated counts, and the rotation sensor unit in which the number of accumulated counts exceeds the threshold value is specified as not corresponding to the wheel 11 where the transmitter 31 that transmitted the transmission signal is arranged. When the number of accumulated counts of the three rotation sensor units out of the four rotation sensor units exceeds the threshold value, it can be specified that the transmitter 31 that transmitted the transmission signal is arranged on the wheel 11 corresponding to the remaining one rotation sensor unit.

A threshold value may be set for the difference between the number of accumulated counts. In this case, when there is a difference of greater than or equal to the threshold value between the number of accumulated counts of one rotation sensor unit and the number of accumulated counts of the other three rotation sensor units, it can be specified that the transmitter 31 that transmitted the transmission signal is arranged on the wheel 11 corresponding to the rotation sensor unit with the least number of accumulated counts.

The transmitter 31 includes the time to make three rotations, as the predetermined number of rotations, in the transmission signal, and transmits the relevant transmission signal, but the predetermined number of rotations may be four or more rotations, or two or less rotations. The predetermined number of rotations may not be a number of rotations of integral multiples, and may be 3.5 rotations, or the like.

The predetermined number of rotations may vary. For example, the time for the wheel 11 to make three rotations may be transmitted by being included in the first transmission signal, and the time for the wheel 11 to make four rotations may be transmitted by being included in the second transmission signal. In this case, the data indicating what the number of times the predetermined number of rotations corresponds to is included in the transmission signal in addition to the time required to make the predetermined number of rotations, and transmits the transmission signal.

In the embodiment described above, the transmission pattern is "+" "+" "−" "−", but may be "+" "−", "−" "−" "+" "+", "+", "+" "+", or "−" "−". That is, an arbitrary transmission pattern can be set from the pattern generated while the wheel 11 makes one rotation. Furthermore, such patterns may be combined.

The acceleration sensor 34 may be arranged such that the detection axis 34a is directed in the vertical direction when located at the uppermost position of the wheel 11. In this case, the positive and negative of the acceleration value detected by the acceleration sensor 34 while the wheel 11 makes one rotation are inverted from the embodiment described above.

The acceleration sensor 34 may be configured such that the detection axis is directed in the vertical direction when located at the front most position of the wheel 11 or when located at the rear most position of the wheel 11. In this case, the increase/decrease of the gravitational acceleration value detected by the detection axis is inverted at the front most position of the wheel 11 and the rear most position of the wheel 11. Thus, the transmission signal may be transmitted at the time the increase/decrease of the gravitational acceleration value is inverted.

The number of pulses generated by the detector 27 each time the wheel 11 makes one rotation may be appropriately changed by changing the number of teeth of the gear 26. Furthermore, the number of pulses while the wheel 11 makes one rotation may be changed by counting either the rise or the fall.

The wheel position specifying device of the embodiment described above may use only the second wheel position specifying process to specify on which wheel 11 each transmitter 31 is arranged.

In the embodiment described above, on which wheel 11 each transmitter 31 is arranged is specified from the difference in the number of pulses, but the number of pulses may be converted to the number of rotations of the wheel 11 and on which wheel 11 each transmitter 31 is arranged may be specified from the difference of the number of rotations of the wheel 11 and the predetermined number of rotations.

In the embodiment described above, when on which wheel 11 each transmitter 31 is arranged is specified by either one of the two wheel position specifying processes, the receiver 50 adopts the result of the process that specified the wheel 11 faster. In this case, the receiver 50 may continue with the other wheel position specifying process. If the results of the two wheel position specifying processes differ, the receiver 50 again carries out the specifying process to enhance the certainty.

DESCRIPTION OF SYMBOLS 10 vehicle
11 wheel
21 to 24 rotation sensor unit
31 transmitter
50 receiver
51 reception controller
52 reception circuit

What is claimed is:

1. A wheel position specifying device arranged on a vehicle mounted with a pulse detecting unit that detects rotation of a wheel as pulses, and a wheel rotation number storage unit that stores a number of pulses detected by the pulse detecting unit in correspondence with time, a tire state detecting device being arranged on each of a plurality of wheels of the vehicle, and the wheel position specifying device specifying on which of the wheels the tire state detecting device is arranged, the wheel position specifying device comprising:

a reception unit that receives a transmission signal, transmitted from each tire state detecting device; and
a specifying unit that specifies on which wheel each tire state detecting device is arranged,
wherein the transmission signal received by the reception unit and transmitted from each tire state detecting device includes a time required for the wheel to make a predetermined number of rotations,
wherein each time the reception unit receives the transmission signal, the specifying unit tracks back by the time for the predetermined number of rotation of the wheel from the instant of receiving the transmission signal and acquires the numbers of pulses counted by each tire state detecting device until receiving the transmission signal,
wherein the specifying unit specifies on which wheel each tire state detecting device is arranged from a difference of the acquired number of pulses and the number of pulses for the predetermined number of rotation of the wheel that is stored in a reception side storage unit, and
wherein the predetermined number of rotations is two or more.

2. The wheel position specifying device according to claim 1, wherein the specifying unit accumulates a difference of the number of pulses counted during the time included in the transmission signal and the number of pulses detected by the pulse detecting unit while the wheel makes the predetermined number of rotations, and specifies on which wheel each tire state detecting device is arranged from the accumulated value.

\* \* \* \* \*